Patented Nov. 17, 1931

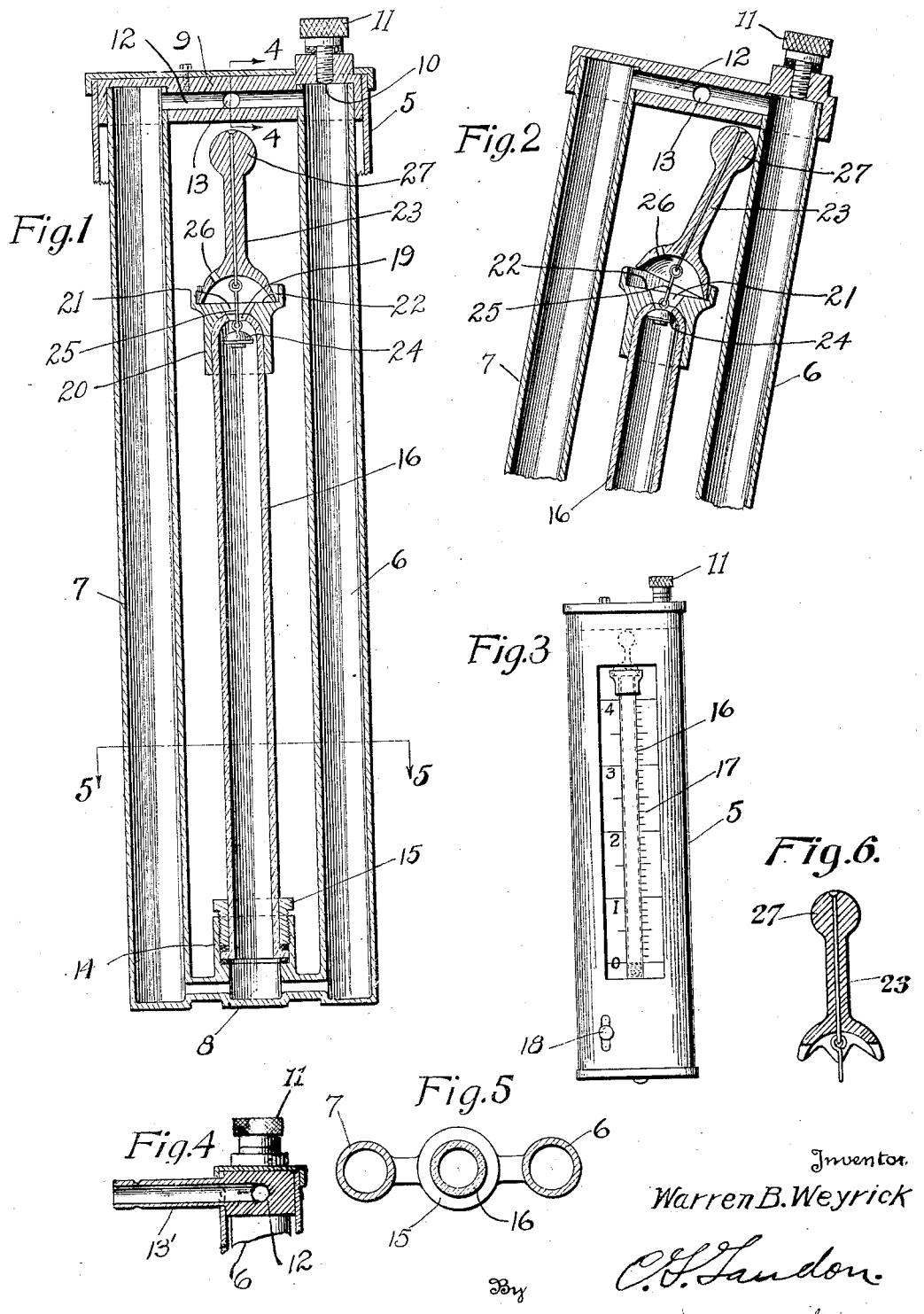

1,832,826

UNITED STATES PATENT OFFICE

WARREN B. WEYRICK, OF AKRON, OHIO, ASSIGNOR TO THE GOODYEAR TIRE & RUBBER COMPANY, OF AKRON, OHIO, A CORPORATION OF OHIO

MANOMETER

Application filed October 4, 1919. Serial No. 328,456.

The present invention relates to improvements in the construction of manometers for indicating the gas pressure in the gas bag of a dirigible balloon, or a similar lighter-than-air craft.

In a device of this kind a glass sight tube is positioned in a suitable casing in fixed relation to a properly calibrated scale, or, the reading scale may be adjustably positioned with relation to the sight tube, as desired. The sight tube is connected at the bottom to a liquid containing tube, into which latter is introduced a suitable liquid, such as mercury, or oils, connection then being made from the top of the liquid containing tube to the gas bag. The pressure of gas in the gas bag against the liquid column in the liquid containing tube forces the liquid up against the atmospheric pressure in the sight tube and the point on the scale which it reaches indicates the actual gas pressure in the gas bag of the vessel. It will be readily apparent that in an instrument of this kind the sight tube must always be exposed to atmospheric pressure at its upper end in order to function.

It has been found in practice that oils of various kinds prove to be the most efficient liquid for use in an instrument of this kind, and it is therefore of great advantage to provide a device for closing the top portion of the sight tube when the instrument is tilted to other than a vertical position, in order to prevent loss of the liquid used as an indicating medium in the sight tube and consequent inaccurate reading of the instrument, and also to prevent damage to the material in the structure of the vessel upon which the liquid may be spilled.

Other objects and advantages of the invention will be apparent as the description proceeds and the invention will be more particularly pointed out in the claims appended hereto.

With reference to the drawings, wherein there has been illustrated a preferred embodiment of the invention as it is reduced to practice, and throughout the several views of which, similar reference numbers designate corresponding parts:

Figure 1 is a vertical section through an instrument embodying this invention, showing same in normal, upright position;

Figure 2 is a vertical section through the upper portion of the same instrument, showing it in a tilted or oblique position with the valve closed;

Figure 3 is a front view of an assembled device;

Figure 4 is a section on the line 4—4 of Figure 1;

Figure 5 is a horizontal section on the line 5—5 of Figure 1; and

Figure 6 is a cross-sectional detail view of a valve closing element as embodied in my invention.

The numeral 5 on the drawings designates a casing of sheet metal, or any preferred material, closed at the bottom thereof. Fitting in the casing 5 and removable therefrom is a container comprising a pair of parallel vertical spaced cylinders or barrels 6 and 7 joined at the bottom by a common passage-way 8. Positioned at the approximate center of the passageway 8 is an upstanding hollow boss 14 internally screw-threaded to receive a packing gland 15 which is adapted to retain and position a sight glass tube 16 open to the passageway 8.

A calibrated scale 17 is positioned in proper relation to the sight glass or tube 16, preferably at the rear thereof, and is vertically adjustable with relation to the sight tube by means of a thumb screw 18 by which the scale 17 is held in fixed adjusted position.

The two top portions of the cylinders or barrels 6 and 7 are connected and held in spaced relation by a cap member 9, said cap member being provided centrally of one of the cylinders or barrels with an orifice 10 for the introduction of liquid into the container, which orifice 10 is normally kept closed by a cap screw 11, or any other suitable form of closure.

A communicating passage 12, connecting at their top portions the cylinders or barrels 6 and 7, is formed in the cap member 9, and a suitable opening 13 and a nozzle 13' are provided in the rear of the cap member for communication with the interior of the gas bag of the balloon or vessel on which the instrument is used.

At its upper end the sight tube is somewhat restricted and is provided with an aperture 19 for the primary purpose of having the sight glass member 16 in communication with the atmospheric pressure. Mounted about the upper portion of the sight glass is a sleeve member 20 having a central opening 21 formed therein registering with the aperture 19 in the sight glass. An annular depression or seat 22 is formed in the upper portion of the sleeve member 20 and is adapted to serve as a seat for a valve closing member 23. Suspended within the sight glass 16 at a suitable distance below the opening 19 is a valve member 24, which has a free pivotal connection, such as a link 25, with the valve closing member 23. The lower portion of the valve closing member 23 may be of bell-shape construction, as shown, in which case it is provided with an opening 26 to provide an air passage to the sight glass 16 when in a vertical position, or it may consist of a series of leg members with open spaces therebetween, as will be understood. The upper end of the valve closing member 23 is formed of a relatively heavy enlargement 27 adapted to impart what might be termed an inverted pendulum movement to said member when the instrument is in other than a vertical position, in a manner now to be described.

Operation

Assuming that the oil or other liquid has been introduced into the container barrels 6 and 7 in quantity sufficient to bring the liquid level to register with the zero point on the scale 17, the device is now ready for use, connection through the opening 13 and the nozzle 13' of course having been made in the usual manner to the gas bag of the balloon or vessel on which the instrument is used. As long as the instrument is maintained in a vertical or upright position the valve operating member 23 is seated in the depression 22 in the sleeve 20 and the valve member 24 is freely suspended below the mouth of the opening 19 in the sight glass. Any movement of the instrument from a vertical position, which may be caused by a sudden rocking or swaying of the car or a quick turning movement thereof, will cause the valve operating member 23 to unseat itself from within the depression 22 drawing the valve member 24 against the opening 19 in the sight glass, thereby closing the same and preventing the contents from being ejected or spilled therefrom.

It will be apparent from the foregoing that the manometer of my invention will always retain the liquid in the device, yet will permit the indicating column to be normally in communication with the atmosphere.

Changes and modifications falling within the scope of the appended claims may, of course, be made, without in any sense departing from the essence of the invention defined therein.

What I claim is:

1. A manometer comprising a liquid container, a sight tube connected therewith, a valve disposed in the sight tube, and means for effecting the seating of said valve in the end of said sight tube to seal the same when the latter is tilted substantially into any position other than a vertical position.

2. In a manometer, a sight tube having an opening at its top, a device operatively associated with said sight tube for closing the same when in other than a substantially vertical position consisting of a valve member, and a valve closing member adapted to bring the valve member in closed relation to the opening in the top of the sight tube to seal said opening.

3. In a manometer, a sight tube provided with an opening, a closing device for the sight tube comprising a valve closing member, a valve freely suspended from the closing member and being disposed within the sight tube adjacent the opening therein, a support for the closing member disposed adjacent to the top of said sight tube, the closing member being adapted to rock upon the support when the tube is in other than a substantially vertical position whereby the valve is seated in the opening of the tube to close the same.

4. In a manometer, a liquid container comprising two spaced, parallel, vertical cylinders provided with means establishing free communication between the cylinders, a sight tube provided with a port communicating with the atmosphere at the top thereof, said sight tube communicating with the cylinders at the base thereof, and means operatively associated with said sight tube for sealing the port when the device is tilted to an oblique position.

5. A manometer including a sight tube having a port in communication with the atmosphere, an inverted pendulum type of valve closing member, said tube being provided with a support for said member, a valve for the port freely suspended from the valve closing member, said valve closing member being adapted to tilt and to actuate the valve to close the port when the device is in other than a substantially vertical position.

6. A manometer comprising a tube normally disposed in a substantially vertical position and adapted to hold a liquid, means operatively associated with said tube for placing it in communication with a source of gas pressure, a sight tube the lower end of which is provided with means establishing communication with said liquid-holding tube and whose upper end is normally in communication with the atmosphere, and valve means operatively associated with said sight tube for automatically cutting off said communication between the sight tube and the atmosphere when said manometer assumes a position other than its normally substantially vertical position.

7. A manometer comprising a tube normally disposed in a substantially vertical position and adapted to hold liquid, means operatively associated with said tube for placing it in communication with a source of gas pressure, a sight tube, the lower end of which is in communication with said liquid-holding tube and whose upper end is normally open, and valve means operatively associated with said sight tube for automatically closing said opening when said manometer assumes substantially a non-vertical position.

In witness whereof, I have hereunto signed my name.

WARREN B. WEYRICK.